May 25, 1954     E. P. FELCH, JR., ET AL     2,679,630
VOLTAGE INDICATING AND RECORDING DEVICE
Filed Feb. 12, 1942
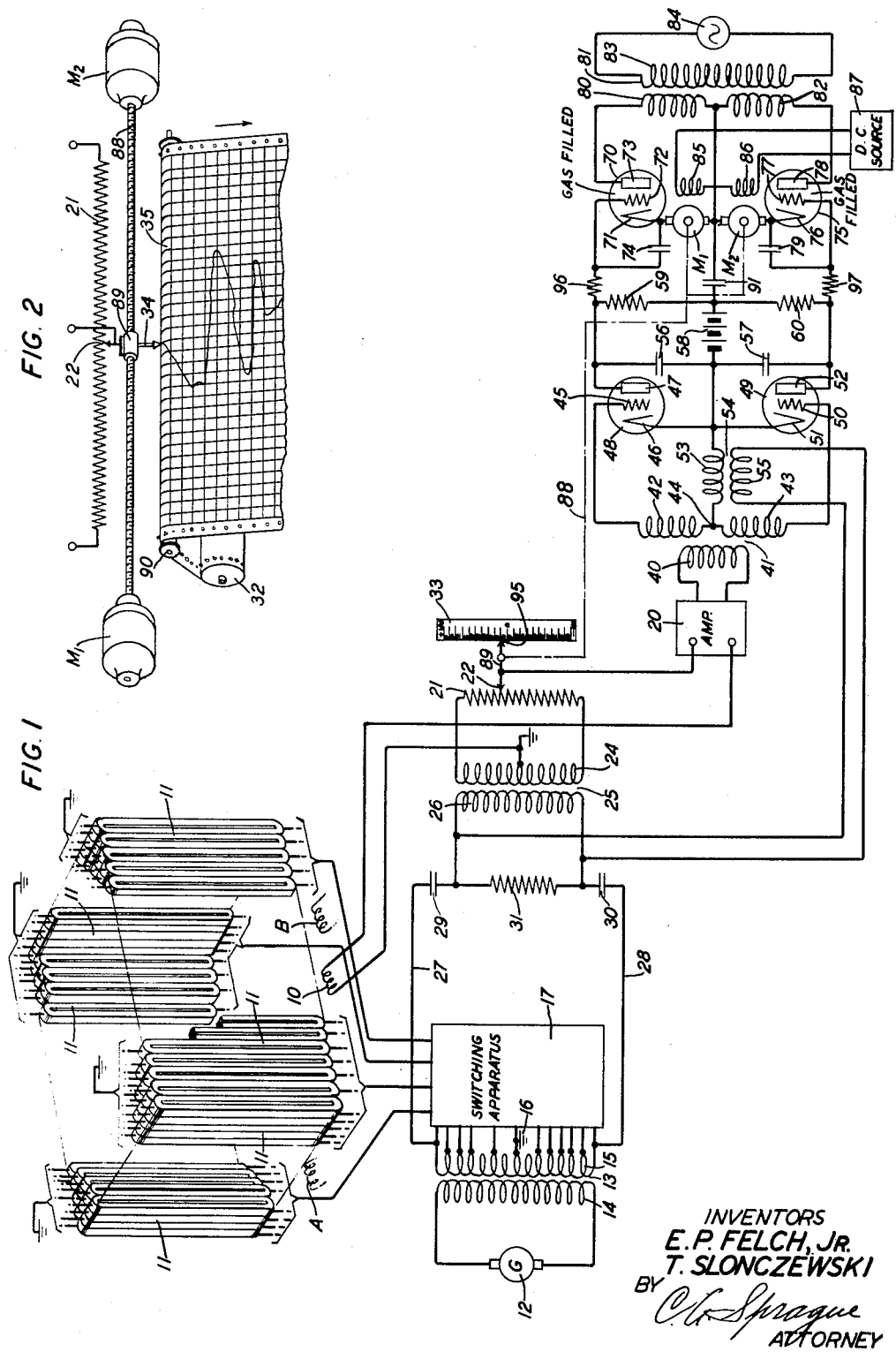
INVENTORS
E. P. FELCH, JR.
T. SLONCZEWSKI
BY
ATTORNEY

Patented May 25, 1954

2,679,630

UNITED STATES PATENT OFFICE 2,679,630

VOLTAGE INDICATING AND RECORDING DEVICE

Edwin P. Felch, Jr., Chatham, N. J., and Thaddeus Slonczewski, Glenwood Landing, N. Y., assignors to Bell Telephone Laboratories, Incorporated, New York, N. Y., a corporation of New York Application February 12, 1942, Serial No. 430,540

7 Claims. (Cl. 324—99)

This invention relates primarily to indicating and recording devices and more specifically to devices for indicating and recording electrical phenomena such as, for example, low intensity voltages.

The problem frequently arises of properly and quickly indicating and recording the intensity of an alternating voltage which may at times have its phase changed by 180 degrees, and of indicating which of the two phase conditions is present. Such a problem arises, for example, when it is desired to record the magnitude and phase condition of a voltage induced in a search coil which is adapted to move through a magnetic field the intensity of which at any point may be different than the intensity at adjacent points and the direction of which at every point is one of two directions, 180 degrees apart.

It is a primary object of the present invention to perform one or more of the operations of indicating and recording the intensity of a voltage which may at times have its phase changed by 180 degrees and also indicate which of the two phase conditions is present.

It is another object of this invention to provide a recording instrument in which a pen or similar marking element has a positive, quick-acting mechanism for driving it in either direction from a central position and wherein mechanical inertia effects are greatly reduced, resulting in an increased speed of response with improved stability and reliability.

It is a further object of this invention to provide novel and improved apparatus for varying a voltage to obtain a balance between it and a second variable voltage.

The foregoing and related objects are attained in an illustrative embodiment of the invention by providing a novel circuit wherein an alternating voltage, which can be varied in intensity and phase condition, is connected in phase opposition to an unknown alternating voltage and varied by motor means until there is a balance between these voltages. The unknown voltage may be, for example, the voltage induced in a search coil adapted to move in a magnetic field set up by a plurality of coils, the current through each one of which may be of intensity different from that flowing in any of its neighbors and may have either of two phase conditions 180 degrees apart. Connected in a series circuit with the unknown voltage and the "balancing" voltage (the one which is varied to produce a balance) is the input circuit of an amplifier across which is applied a voltage equal in magnitude to the vector sum of the unknown voltage and the voltage utilized in balancing. The output circuit of the amplifier is applied to a push-pull detector, the amplified voltage being applied, preferably through a transformer, between the control elements of the two electron discharge devices, while another alternating voltage, of the same frequency as the amplified voltage and of such phase that it is added to the voltage (from the amplifier) applied between the control element and the cathode of one of the tubes and is subtracted from the voltage (from the amplifier) applied between the control element and the cathode of the other of said tubes, is applied in the connection between the common terminal of the two cathodes and the mid-tap of the secondary winding of the transformer. Inasmuch as a condenser is provided between the anode and the cathode of each of these two tubes to shunt out the alternating current in the output wave, there flows through resistances connected between the two anodes, a direct current which varies in direction dependent upon the phase condition of the vector sum voltage, or, expressed in other words, dependent upon the algebraic sign of the vector sum voltage. This direct current is applied to a motor driving circuit preferably comprising two gas-filled, grid-controlled devices of the "Thyratron" type each having connected between its cathode and anode an armature of a motor. Each motor is adapted to drive a pen or stylus in a direction transverse to the direction in which the paper chart is driven by rollers, one of said motors when energized tending to drive the pen in one direction from a central position and the other of said motors adapted to drive the pen in the other direction from the central position. The direct current for the field windings of the motors is supplied from any suitable source. An alternating voltage is applied to the output circuit of each of said gas-filled devices in order that the grid or control element of each device may "regain" control of the discharge therein. The direction of flow of the direct current applied to the gas-filled devices' input circuits determines which of the gas-filled devices discharges and thus determines which of the motors is driven. The motors also vary the position of the movable tap on a slide wire potentiometer (to produce the "balancing" voltage) until balance is reached (the vector sum voltage is zero). The external terminals of the potentiometer are connected to a source of alternating voltage. Preferably this voltage is obtained from the same source which energizes the coils setting up the magnetic field which is measured at various positions of the search coil. This source may also supply the voltage which is applied to the common input circuit of the two electron discharge devices constituting the push-pull detector. A scale calibrated in positive and negative volts is preferably placed in front of the potentiometer to indicate the intensity and phase condition of the unknown voltage.

The invention will be more readily understood by referring to the following description taken in connection with the accompanying drawings forming a part thereof in which:

Fig. 1 is a schematic diagram of a recorder of this invention and of a system wherein it may be used; and Fig. 2 is a more detailed showing of a portion of the arrangement shown in Fig. 1.

Referring more specifically to the drawing, Fig. 1 shows apparatus for indicating and recording a voltage, which by way of example to illustrate the principles of novelty of this invention, will be considered as the voltage induced across a search coil 10, which voltage may have one or the other of two phase conditions 180 degrees apart, and for indicating which of these two phase conditions is present. While the voltage to be measured by the recording device of this invention is described as that existing across a search coil, it will be apparent that the invention is not limited thereto and the recorder is equally applicable to the measurement of any alternating voltage. As a specific example of an application of the recorder of this invention, there is shown in Fig. 1 a series of coils 11 each of which receives current of, for example, 270 cycles, from a source 12 through a transformer 13 and switching apparatus 17. Each coil 11 may, for example, comprise a continuous single layer of high resistance wire wound around a strip of phenol fibre about five feet long. Because of this manner of construction, the resistance of each coil is very large compared with its inductance. The transformer 13 has its primary winding connected to the generator 12 and its secondary winding 15 tapped to provide many inner terminals. As a specific example, the mid-point 16 of the secondary winding 15 is connected to ground and there are also provided 100 taps above this point and 100 taps below this point. All of the terminals of the secondary winding 15 of the transformer 13 are connected to suitable switching apparatus represented by the box 17 from which output leads are connected to each of the coils 11. One terminal of each of the coils 11 is connected to ground and the other terminal of each coil is connected by means of the switching apparatus 17 to any one of the 100 positive voltages (at a certain instant) or the 100 negative voltages (at this same instant) provided by the transformer 13. It will be apparent that if at any given time a positive potential is applied to the ungrounded terminal of any one of the coils 11, the current at that time flows therein in one direction while if a negative potential is at that time applied to the ungrounded terminal of this coil, a current flows therein in the opposite direction. The search coil 10 is adapted to move in various planes under the lower ends of the coils 11. Three positions for such coils have been indicated by the full line search coil 10 and the dotted coils A and B. It will be apparent that, in any position, the flux linking the coil 10 is set up by current flowing through many of the coils 11 and as the current flows in one direction through some of the coils and in the opposite direction through others of the coils, the voltage induced across the search coil 10 may assume one phase condition at one position and have a phase condition 180 degrees removed from this first-mentioned condition at some other point. The recorder of this invention, as pointed out above, not only indicates the voltage induced across the search coil 10 but also indicates which of the two phase conditions is present. Considering the portion of the field lying in a horizontal plane beneath the coils 11, it is apparent, then, that each elemental portion thereof has an intensity and instantaneous direction along any particular horizontal line through that portion in said plane which depends respectively upon the amplitudes of the currents in the coils above and the instantaneous direction of the currents through those coils. Each current may be given either of two phase conditions, 180 degrees apart, with respect to their common source, depending upon which of the two possible ways of connecting the coil terminals to the source is at that time being utilized. Search coil 10 may be moved in this plane so as to scan the field at this plane for all the elementary areas thereof. The electromotive forces induced in coil 10 may in portions of this plane have their phase different by 180 degrees from that of the remaining ones in other portions of this plane. By trial (or by calculation where possible), the polarity of the connections of the coils and the intensity of the currents through the coils may be chosen so that the field simulates on a reduced scale, approximately at least, another field, which field has previously been investigated along one plane (or other small number of planes) only, like the one mentioned above, to determine the field characteristics of the individual elemental areas thereof. The simulated field so produced may then be investigated, by means of the search coil 10, in other planes as desired. Thus, a model of a large magnetic field may be provided for laboratory investigation, which may be particularly useful in case the original field is such that a desired investigation of it may be more easily made from a model.

The coils 11 and switching apparatus 17 per se form no part of applicants' invention. They have been shown merely to illustrate one possible use of the invention, which, as will appear from the appended claims, is not limited to any particular means for originating the electromotive forces from which those utilized are derived. Various uses of the invention in its different aspects defined by the claims will occur to those skilled in the electrical arts.

The search coil 10 is connected in series with the input circuit of an amplifier 20 and that portion of a potentiometer 21 connected between an inner terminal 22 and the effective mid-point or intermediate balance point of the potentiometer 21. This balance point may be grounded directly or it may be grounded externally by grounding the mid-point of the secondary winding 24 of a transformer 25, the primary winding 26 of which is connected through suitable phase shifting apparatus to the outer terminals of the secondary winding 15 of the transformer 13. This phase shifting apparatus is necessary in order that the voltage between the balance point of the potentiometer 21 and the point 22 at which the slide wire finally comes to rest after balance is obtained is exactly equal to and opposite in phase with respect to the voltage induced in the search coil 10. Due to the fact that the coils 11 have very little inductance in comparison with their resistance, the voltage induced across the search coil 10 is substantially 90 degrees out of phase with respect to the voltage across the secondary winding 15. Consequently, the leads 27 and 28 from the secondary winding 15 are connected to a series circuit comprising two condensers 29 and 30 and the resistance 31, the constants of which are so chosen that the voltage across the resistance 31 is substantially in phase or 180 degrees out of phase with respect to the voltage induced in the coil 10 and hence so that the voltage across the terminals of the potentiometer 21 is either in phase or 180 degrees out of phase with respect to the votage induced across the search coil 10. The voltage applied to the input terminal of the amplifier 20 is equal in magnitude and opposite in phase to the vector sum of the voltage induced in the search coil 10 and the voltage across that portion of the potentiometer 21 between the variable contact point 22 and the effective mid-point. By means now to be described, the voltage appearing in the input circuit of the amplifier 20 is reduced to zero and at the same time (see Fig. 2) a pen, stylus or other indicating device 34 is driven across a chart 35, which is adapted to be moved between an unwinding roll 32 and a winding roll (not shown), the pen or other marking element 34 being moved in a direction transverse to the direction of the movement of the chart 35. An indicating scale 33, which is schematically indicated in Fig. 1 as being on the side of the sliding element 89 remote from the resistance 21, is preferably mounted above the chart 35 and in front of the resistance 21. This scale is calibrated so that the central position is zero, "plus" volts (or millivolts) being indicated on one side of this zero position and "minus" volts (or millivolts) being indicated on the other side of this zero position. The "plus" and "minus" indications tell the observer which of the two phase conditions of the search coil voltage is present.

The motors M1 and M2 which drive the sliding contact 22 on the potentiometer 21 and also the marking member 34 across the chart 35 and the needle or pointer 95 for the indicating instrument are adapted to be driven by direct current and as the current in the output circuit of the amplifier 20 is alternating, it is necessary to obtain a direct current properly representative in direction of the phase of this alternating current to drive one or the other of the motors M1 and M2. For this purpose the output current from the amplifier 20 is applied to the primary winding 40 of the transformer 41 which has two secondary windings 42 and 43 having a common terminal 44. The outer terminal of the winding 42 is connected to the control element 45 of the electron discharge device 48 while the outer terminal of the winding 43 is connected to control element 50 of the electron discharge device 49. The cathodes 46 and 51 of the tubes 48 and 49, respectively, are connected through secondary winding 53 and the transformer 54 to the common terminal 44 of the secondary windings 42 and 43. The primary winding 55 of the transformer 54 is connected across the terminals of the primary winding 26 of the transformer 25 whereby the voltage induced in the secondary winding 53 is either in phase or 180 degrees out of phase with respect to the voltage across the windings 42 and 43. Suitable phase shifting apparatus (not shown) may be provided, if necessary, to obtain this phase relationship.

Connected between the anode 47 and the cathode 46 of the tube 48 is the condenser 56 and between the anode 52 and the cathode 51 of the tube 49 is connected a similar condenser 57. The purpose of the condensers 56 and 57 is to provide a shunt path for the alternating current in the output circuit of the tubes 48 and 49. Resistors 59 and 60 are connected between the anode 47 and the anode 52 and the common terminal of these resistors is connected through a source of plate potential 58 to the common terminal of the cathodes 46 and 51. The tubes 48 and 49 and the circuit elements connected thereto are so selected and adjusted that in the absence of current in the secondary windings 42 and 43, the direct current in resistor 59 is equal and opposite to the direct current in resistor 60.

The anode 47 of the tube 48 is connected directly (or through resistor 96) to the control element 72 of a grid-controlled gas-filled electron discharge device 70 while the anode 52 of the tube 49 is connected directly (or through resistor 97) to the control element 77 of a gas-filled grid-controlled electron discharge device 75. Connected in circuit between the anode 73 and the cathode 71 of the device 70 is the secondary coil 80 of the transformer 81 and the armature winding of the motor M1. A condenser 74 is connected between the cathode and control element of the tube 70 while a similar condenser 79 is connected between the cathode and control element of tube 75. The condensers 74 and 79 and the resistors 96 and 97 are not absolutely essential but do aid somewhat in maintaining stability to prevent the tubes 79 and 75 from firing from extraneous transient currents. They must not, however, be so large in capacity as to slow down appreciably the response of these tubes to normal input signals. Connected in circuit between the anode 78 and the cathode 76 of the discharge device 75 is the secondary winding 82 of the transformer 81 and the armature winding of the motor M2. Alternating current of a frequency of, for example, 60 cycles, is applied to the primary winding 83 of the transformer 81 from the source 84. Direct current for the field windings 85 and 86 of the motors M1 and M2, respectively, is obtained from a suitable direct current source 87 or the fields may be of the permanent magnet type. The motor armatures are connected to a drive shaft 88 in such a way that the rotation of the motor M1 drives the drive shaft 88 in one direction with the consequent movement of the follower 89 in one transverse direction, while a rotation of the motor M2 rotates the shaft 88 in the opposite direction and moves the follower 89 in the opposite transverse direction. The movement of the follower 89 moves the pen or other marking element 34 in transverse direction across the chart 35 and at the same time varies the position of the variable tap 22 on the resistor 21 and moves the needle 95 across the indicating scale 33. The chart 35 is unwound from roller 32 and driven over roller 90, to a wind-up roller (not shown) as indicated schematically in Fig. 2. If the search coil 10 is driven from one position to another by motor means, it is preferable to synchronize this means with the motor driving the chart 35. For the sake of simplicity in the drawing, the chart 35 and its driving equipment have been omitted from Fig. 1. Moreover, the mechanical linkage between the armatures of the motors M1 and M2 to the slider 89 has been indicated by dot and dash lines rather than by a physical connection.

While two motors have been shown in the arrangement of Fig. 1, it is obvious that one motor with reversible windings may be used instead.

The operation of the device shown in Fig. 1 is as follows: Assume that the search coil 10 is placed as shown in the full line position in the drawing and there is induced thereacross a voltage which has a certain phase condition with respect to the voltage of the generator 12. With the connections as shown, this voltage will be substantially 90 degrees out of phase with respect to the generated voltage. By means of the phase shifting network 29, 30 and 31 and transformer 25, the voltage across the potentiometer 21 is made either in phase with the voltage across the search coil 10 or out of phase with respect thereto depending upon the position of the sliding tap 22 with respect to the intermediate balance point which, as shown in the drawing, is effectively connected to ground by grounding the mid-point of the secondary winding 24 of the transformer 25. Depending upon the position of the tap 22 before the motor apparatus acts to shift it, the potentiometer voltage in circuit with the voltage across the search coil 10 is either in phase with the search coil voltage or 180 degrees out of phase therewith. In either case, however, the voltage applied to the input circuit of the amplifier 20 is equal in magnitude to the vector sum of the search coil voltage and the voltage between the variable tap 22 and the effective mid-point of the transformer 21. The amplifier 20 may be two or more stages and the output current thereof is applied to the primary winding 40 of the transformer 41, the secondary winding of which is split so that half of the secondary voltage is applied between the cathode 46 and the control element 45 of the tube 48 and the other half (in opposite phase) is applied between the cathode and control element of the tube 49. By means of the transformer 54, a voltage is applied between the cathode and the control element of each of the tubes which is in phase with one and out of phase with respect to the other of the input voltages from the secondary windings 42 and 43. When no current flows through the primary winding 40, equal input signals are applied to control elements 45 and 50 and in the same phase so that the currents in the output circuit of these tubes 48 and 49 are balanced. The bias on the control elements of the gas tubes 70 and 75 is made such that when this balanced condition is present, neither tube fires. Now, when a current flows through the winding 40 of the transformer 41, the voltage across one-half of the split secondary 42, 43 is added to the voltage across the secondary winding 53 to produce a larger input signal through one of the tubes 48 and 49 while the voltage across the other of said secondary windings 42 and 43 is subtracted from the voltage across the winding 53 to produce a smaller input signal for the other of these tubes. Thus one tube produces a greater current than the other. The alternating current in the output circuits of the tubes 48 and 49 is shunted by the condensers 56 and 57 and there appears across the resistors 59 and 60 a direct current the direction of which is dependent upon which of the tubes 48 and 49 is conducting the most current. When this current is in one direction, for example in a direction which will tend to make the control element 72 of the gas-filled device 70 swing in a positive direction and which will make the control element 77 of the gas-filled device 75 swing in a negative direction, motor M1 is actuated while motor M2 is not. The direct current flow will be in the opposite direction and motor M2 will be actuated while motor M1 remains unoperated when the vector sum voltage has a phase condition which is 180 degrees removed from the first assumed phase condition. The gas-filled tubes 70 and 75 are normally (in the absence of current in the winding 40) biased to cut-off by means of the bias battery 91. In fact, battery 91 is adjusted to slightly overbias these tubes so as to allow a slight margin to aid in maintaining stability. Assume that the phase relationship in the circuit just described is such that the direct current in the resistors 59 and 60 is in such a direction that it causes the voltage of the grid of tube 70 to increase in the positive direction beyond its critical control point and that of the grid of the gas-filled tube 75 to become more negative at the same instant that both plates 73 and 78 are positive. With these conditions it is obvious that plates 73 and 78 become positive sixty times per second in accordance with the variations in voltage supplied thereto from the source 84. It will be apparent under these conditions that only gas tube 70 will fire since the grid of the tube 75 is 180 degrees out of phase with the voltage on the plate. This drives motor M1 in a direction which tends to decrease the input voltage of the amplifier 20. As long as this current flows in the input circuit of the amplifier 20, or in other words as long as that portion of potentiometer voltage 21 between the variable tap 22 and the effective mid-point does not balance the voltage across search coil 10, tube 70 will continue to fire on every positive half cycle. Each time that tube 70 fires a positive pulse of current will flow through motor armature M1 and motor M1 will very rapidly increase in speed, the actual final speed which it attains depending upon the amount of departure from balance. After a gas tube fires the grid loses control thereover but the use of the alternating voltage in the plate circuit of the tubes 70 and 75 permits each grid to regain control by stopping the discharge once each cycle. So long as the direction of the direct current through resistors 59 and 60 is such as to fire tube 70, the tube 75 cannot fire because the grid voltage is made even more negative than the critical firing voltage.

Now if the direction of the direct current through the resistors 59 and 60 is changed, the tube 75 is fired and the armature of the motor M2 is actuated, and the armature of the motor M1 remains unoperated. It should be noted that the actual speed of the motor is not necessarily a linear function of the degree of departure from balance. It is more accurately expressed as being a monotonically increasing function of the departure from balance. The important thing to note is that as the condition of balance is approached, the speed of the motor is rapidly brought to zero. This insures a high degree of stability and with the inertia of the mechanical parts kept at a minimum, the speed of response is very high. It has been found by actual construction that the coasting period between alternate discharges in the tubes 70 and 75 can be made very short, resulting in very close speed control and freedom from overshooting. For a more complete description of a somewhat similar motor control means actuated by two gas-filled devices, reference is made to an application Serial No. 297,088, filed September 29, 1939, by W. J. Means and T. Slonczewski and which issued as Patent 2,396,187 on March 5, 1946. As one motor or the other rotates the shaft 88, the slider 89 moves over the paper chart 35 which is caused to move downward in the plane of the drawing by means of the driver roll (not shown) and to continue its tracing until a point of balance is reached between the potentiometer voltage and the search coil voltage. At this point neither motor M1 or M2 is actuated as there is no voltage across the input circuit of the amplifier 20. If desired, the voltage at this balance point may be read from the calibrated scale 33 which, as pointed out above, may be mounted in front of the resistor 21. If now the search coil 10 is moved to another position, such as for example the dotted position A or position B indicated in Fig. 1, the process described above is repeated until balance is again reached between the search coil and the potentiometer voltage.

In actual practice, suitable mechanical guide tracks are employed to confine the direction of travel of the stylus or other marking member 34 and the slider 89 to a straight line. These tracks have been omitted in these figures for the sake of clarity but any of the forms of guide tracks well known in the recorder art may be employed.

While the invention has been shown and described in connection with a recording and indicating instrument, it will be obvious to those skilled in the art that certain of the principles employed and the circuits shown and described are capable of use in other devices such as, for example, in control circuits. Other modifications may be made in the embodiment described without departing from the spirit of the invention, the scope of which is indicated in the appended claims.

What is claimed is:

1. In combination, a source of alternating current, means including a search coil moving in a magnetic field set up by current from said source for deriving an alternating voltage, means for deriving a second alternating voltage of the same frequency as said first alternating voltage, and means for varying said second alternating voltage until it is equal in magnitude and in phase opposition to said first alternating voltage, said last-mentioned means comprising means for deriving an alternating voltage representing the vector sum of said first and second alternating voltages, means for deriving from said vector sum voltage a direct voltage the direction of which is dependent on the sign of said vector sum voltage, and means for utilizing said direct voltage to vary said second alternating voltage until it is equal in magnitude and in phase opposition to said first alternating voltage.

2. A source of alternating voltage, direct current generating means for setting up a direct current in its output when an alternating voltage is applied to its input, a circuit element connected to the input of said direct current generating means, two separate means for deriving two alternating voltages of the same frequency from said source and connecting them in a single series circuit with said circuit element, means controlled by said direct current for bringing the vector sum of said derived voltages to zero value, and a third means for deriving alternating voltage of said frequency from said source and applying it to said input of said direct current generating means to cause said direct current generating means to generate direct current in one direction when the vector sum of said first two alternating voltages has one algebraic sign and in the opposite direction when the vector sum of said two alternating voltages has the opposite algebraic sign.

3. In combination, an impedance element, means for deriving across said element an alternating voltage which has an unknown magnitude and phase, a resistance member having two outer terminals and a variable inner terminal, means for applying a source of potential of the same frequency as said unknown voltage to the outer terminals of said resistance member, means for fixing the potential of the mid-point of said resistance member, means for varying the position of said inner terminal so that it can be connected to said resistance member on either one side or the other of said mid-point, means for connecting said impedance element and that portion of the resistance member included between said mid-point and said variable terminal in such a way that a voltage equal to the vector sum of said two voltages is produced, and means for reducing said vector sum voltage to zero, said last-mentioned means including motor means for varying the position of said inner terminal.

4. In combination, an impedance element, means for deriving across said element an alternating voltage which has an unknown magnitude and phase, a resistance member having two outer terminals and a variable inner terminal, means for applying a source of potential of the same frequency as said unknown voltage to the outside terminals of said resistance member, means for effectively fixing the potential of the mid-point of said resistance member, means for varying the position of said variable inner terminal so that it can be connected to said resistance member on either one side or the other of said mid-point, means for connecting said impedance element and that portion of the resistance member included between said mid-point and said variable inner terminal in such a way that a voltage is produced equal to the vector sum of said voltages across the element and said portion of the resistance member, and means for reducing said vector sum voltage to zero, said last-mentioned means including means for deriving from said vector sum voltage a direct voltage, the direction of which is dependent on the sign of said vector sum voltage, and means for utilizing said direct voltage to vary the position of said variable inner terminal of said resistance until said vector sum becomes zero.

5. In combination, an impedance element, means for deriving across said impedance element an alternating voltage which has an unknown magnitude and phase, a resistance member having two outer terminals and a variable inner terminal, means for applying a source of potential of the same frequency as said unknown voltage to the outside terminals of said resistance member, means for fixing the potential of the mid-point of said resistance member, means for varying the position of said variable inner terminal so that it can be connected to said resistance member on either one side or the other of said mid-point, means for connecting said impedance element and that portion of the resistance member included between said mid-point and said variable inner terminal in such a way that a voltage is produced equal to the vector sum of said voltages across the element and said portion of said resistance member, and means for reducing said vector sum voltage to zero, said last-mentioned means including a balanced detector arrangement comprising two electron discharge devices connected in push-pull, each of said discharge devices having an anode, a cathode, and a control element, means for applying between the control elements of said two electron discharge devices a second alternating voltage having its magnitude and phase determined by the vector sum voltage, means for applying a third alternating voltage between the cathode and the control element of each of said electron discharge devices, said third alternating voltage having a phase relationship with respect to said vector sum voltage such that it is either in phase or 180 degrees out of phase with respect to said voltage, means for by-passing the alternating portion of the output wave in said push-pull arrangement whereby a direct current is produced the direction of which is dependent upon the algebraic sign of the vector sum voltage, and means for utilizing this direct voltage to vary the position of the variable contact on said resistance member until said vector sum voltage is equal to zero.

6. In combination, an impedance element, means for deriving across said element an alternating voltage which has an unknown magnitude and phase, a resistance member having two outer terminals and a variable inner terminal, means for applying a source of potential of the same frequency as said unknown voltage to the outside terminals of said resistance member, means for fixing the potential of the mid-point of said resistance member, means for varying the position of said variable inner terminal so that it can be connected to said resistance member on either one side or the other of said mid-point, means for connecting said impedance element and that portion of the resistance member included between said mid-point and said variable inner terminal in such a way that a voltage is produced equal to the vector sum of the voltages across the element and said portion of the resistance member, and means for reducing said vector sum voltage to zero, said last-mentioned means including a balanced detector arrangement comprising two electron discharge devices connected in push-pull, each of said discharge devices having an anode, a cathode, and a control element, means for applying between the control elements of said two electron discharge devices a second alternating voltage having its magnitude and phase determined by the vector sum voltage, means for applying a third alternating voltage between the cathode and control element of each of said electron discharge devices, said third alternating voltage having a phase relationship such that it is either in-phase or one-half wave-length out-of-phase with respect to said vector sum voltage, means for by-passing the alternating portion of the output wave in said push-pull arrangement whereby a direct current is produced the direction of which is dependent upon the algebraic sign of the vector sum voltage, two motors, one of them connected to move said variable inner terminal in one direction and the other of which is connected to move said variable inner terminal in the opposite direction, and means responsive to the direction of said direct current for energizing one or the other of said motors to vary the position of said variable inner terminal.

7. In combination, an impedance element, means for deriving across said element an alternating voltage which has an unknown magnitude and phase, a resistance member having two outer terminals and a variable inner terminal, means for applying a source of potential of the same frequency as said unknown voltage to the outside terminals of said resistance member, means for fixing the potential of the mid-point of said resistance member, means for varying the position of said variable inner terminal so that it can be connected to said resistance member on either one side or the other of said mid-point, means for connecting said impedance element and that portion of the resistance member included between said mid-point and said variable inner terminal in such a way that a voltage is produced equal to the vector sum of the voltages across the element and said portion of the resistance member, and means for reducing said vector sum voltage to zero, said last-mentioned means including a balanced detector arrangement comprising two electron discharge devices connected in push-pull, each of said discharge devices having an anode, a cathode, and a control element, means for applying between the control elements of said two electron discharge devices a second alternating voltage having its magnitude and phase determined by the vector sum voltage, means for applying a third alternating voltage between the cathode and control element of each of said electron discharge devices, said third alternating voltage having a phase relationship such that it is either in phase or 180 degrees out of phase with respect to said voltage, means for by-passing the alternating portion of the output wave of said push-pull arrangement whereby a direct current is produced the direction of which is dependent upon the algebraic sign of the vector sum voltage, two motors, one of which is connected to move said variable inner terminal in one direction and the other of which is connected to move said variable inner terminal in the other direction with respect to said mid-point, and means responsive to the direction of said direct current for energizing one or the other of said motors to move said variable inner terminal, said last-mentioned means comprising two gas-filled grid controlled electron discharge devices, means for connecting the armature of one of said motors in the circuit between the cathode and the anode of one of said gas-filled devices and means for connecting the armature of the second of said motors in the circuit between the cathode and the anode of the second of said gas-filled devices, means for applying said direct voltage between the two grids, and means for applying an alternating voltage between said two anodes.

References Cited in the file of this patent

UNITED STATES PATENTS

| Number | Name | Date |
|---|---|---|
| 2,121,054 | Satterlee | June 21, 1938 |
| 2,131,759 | Satterlee | Oct. 4, 1938 |
| 2,134,901 | Wey | Nov. 1, 1938 |
| 2,147,674 | Satterlee | Feb. 21, 1939 |
| 2,163,632 | Satterlee | June 27, 1939 |
| 2,191,997 | Side | Feb. 27, 1940 |
| 2,203,689 | MacDonald | June 11, 1940 |
| 2,209,369 | Wills | July 30, 1940 |